(12) United States Patent
Shiau et al.

(10) Patent No.: US 9,698,702 B1
(45) Date of Patent: Jul. 4, 2017

(54) SWITCHING POWER SUPPLY AND A POWER SUPPLY APPARATUS THAT INCORPORATES THE SAME

(71) Applicant: Asner Electronic Co., LTD, New Taipei (TW)

(72) Inventors: Miin-Shyue Shiau, Taichung (TW); Chien-Chih Hung, New Taipei (TW)

(*) Notice: Subject to any disclaimer, the term of this patent is extended or adjusted under 35 U.S.C. 154(b) by 0 days.

(21) Appl. No.: 15/062,130

(22) Filed: Mar. 6, 2016

(30) Foreign Application Priority Data

Dec. 29, 2015 (TW) .............................. 104144331 A (51) Int. Cl.
*H02M 7/06* (2006.01)
*H02M 3/156* (2006.01)
*H02M 1/08* (2006.01)
*H02M 1/00* (2006.01)

(52) U.S. Cl.
CPC .............. *H02M 7/06* (2013.01); *H02M 1/08* (2013.01); *H02M 2001/0009* (2013.01)

(58) Field of Classification Search
CPC .. H02M 7/06; H02M 1/08; H02M 2001/0009; H02M 3/156; H02J 1/102; H02J 2001/106; Y10T 307/50; Y10T 307/305; Y10T 307/352; Y10T 307/549; Y10T 307/391
USPC .......................................................... 363/84
See application file for complete search history.

(56) References Cited

U.S. PATENT DOCUMENTS

| | | | | | |
|---|---|---|---|---|---|
| 4,866,295 A | * | 9/1989 | Leventis | ................... | G05F 1/59 307/43 |
| 5,170,496 A | * | 12/1992 | Viereck | ................ | H04B 1/0458 333/17.1 |
| 6,023,363 A | * | 2/2000 | Harada | .............. | H04B 10/6931 250/214 R |

(Continued)

FOREIGN PATENT DOCUMENTS

| | | |
|---|---|---|
| CN | 102176302 | 5/2012 |
| TW | 201044737 | 12/2010 |

(Continued)

OTHER PUBLICATIONS

Received search report from EIC 2800 STIC searcher John DiGeronimo on Dec. 22, 2016.*

*Primary Examiner* — Gary L Laxton
*Assistant Examiner* — Htet Z Kyaw (57) ABSTRACT

A switching power supply and a power supply apparatus that incorporates the switching power supply are provided. Advantages of the switching power supply include the following:

1. Two or more switching power supplies can be used in parallel when they have the same kind of input power and the same rated output power.
2. Two or more switching power supplies can be used in parallel when they have the same rated output power but different kinds of input power.
3. Two or more switching power supplies can be used in parallel when they have the same kind of input power but different rated output powers.
4. Two or more switching power supplies can be used in parallel when they have different kinds of input power and different rated output power.

(Continued)

5. When the above-described switching power supplies are connected in parallel, the respective load proportion of each of them can be adjusted at will.

17 Claims, 9 Drawing Sheets

(56) References Cited

U.S. PATENT DOCUMENTS

| | | | | |
|---|---|---|---|---|
| 6,459,171 B1* | 10/2002 | Leifer | ............... | H02J 1/10 307/24 |
| 6,574,124 B2* | 6/2003 | Lin | ............... | H02M 3/1584 363/65 |
| 8,120,204 B2 | 2/2012 | Moon | | |
| 8,198,874 B2* | 6/2012 | Melanson | ............... | H02M 3/156 323/222 |
| 8,645,726 B2* | 2/2014 | Lee | ............... | H02J 1/102 307/18 |
| 8,829,714 B2* | 9/2014 | Lai | ............... | H02J 9/061 307/66 |
| 2008/0136399 A1* | 6/2008 | Alfano | ............... | G01R 19/0092 323/301 |
| 2012/0146604 A1* | 6/2012 | Seki | ............... | H02M 3/158 323/282 |
| 2013/0063106 A1* | 3/2013 | Nishida | ............... | H02M 3/156 323/271 |
| 2014/0043006 A1* | 2/2014 | Tan | ............... | H02M 3/157 323/298 |
| 2014/0253084 A1* | 9/2014 | Chen | ............... | H02M 3/156 323/293 |
| 2014/0320098 A1* | 10/2014 | Izumoto | ............... | H02M 3/156 323/282 |
| 2016/0079858 A1* | 3/2016 | Chen | ............... | H02M 1/00 323/271 |

FOREIGN PATENT DOCUMENTS

| | | |
|---|---|---|
| TW | 201134059 | 10/2011 |
| TW | M523138 | 6/2016 |

* cited by examiner

SWITCHING POWER SUPPLY AND A POWER SUPPLY APPARATUS THAT INCORPORATES THE SAME

CROSS REFERENCE TO RELATED APPLICATIONS

This Non-provisional application claims priority under 35 U.S.C. §119(a) on Patent Application No. 104144331 filed in Taiwan, Republic of China on Dec. 29, 2015, the entire contents of which are hereby incorporated by reference

BACKGROUND OF THE INVENTION

Field of Invention

This invention relates generally to a power supply and a power supply apparatus, and particularly to switching power supplies and a power supply apparatus using the switching power supplies.

Related Art

With the increasing network bandwidth, the so-called cloud computing is gaining more popularity. As a result, more data centers are built, and the size of each data center becomes larger. As the scale of the data centers increases, the demand for energy rises, and so is the demand for more switching power supplies. In addition, in order to provide higher power, it is often practical to connect multiple switching power supplies in parallel, instead of using a single power supply with a large power output.

Figure 1:
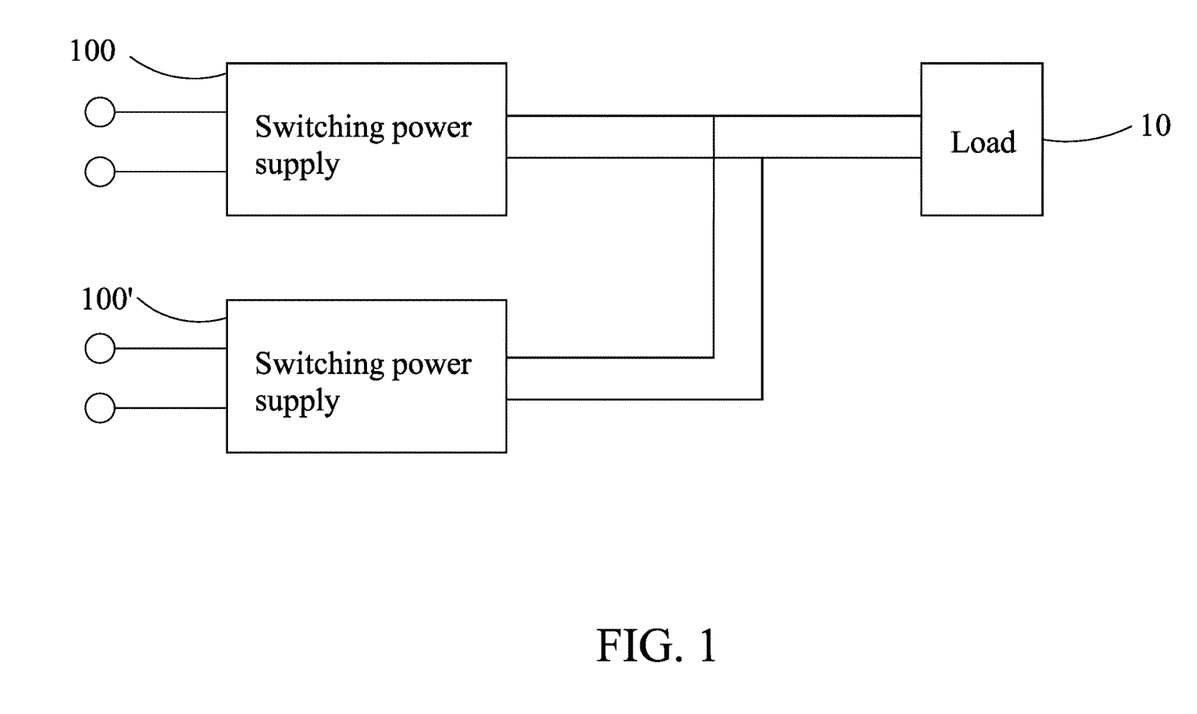
FIG. 1 provides an illustrative view of a conventional parallel usage of switching power supplies.

However, due to precision limitations in the manufacture process, there can still exist slight difference in output voltages even for two switching power supplies with the same specification. FIG. 1 provides an illustrative view of a conventional parallel usage of two switching power supplies. In FIG. 1, two switching power supplies 100 and 100' are connected in parallel to provide power to the same load 10. The switching power supply 100 and the switching power supply 100' may, for example, have the same rated output voltage and the same output power. Thus, the switching power supply 100 and the switching power supply 100' shall theoretically evenly provide the power to the same load 10. However, due to their manufacturing process, the switching power supply 100 and the switching power supply 100' may have different reference voltages. This will cause their output voltages to be different. For example, if the switching power supply 100 has a smaller reference voltage than the reference voltage of the switching power supply 100', when the switching power supply 100 and the switching power supply 100' are connected to the same load 10, the feedback circuit of the switching power supply 100' will detect a voltage that is always higher than the reference voltage of the switching power supply 100' itself. This will cause the switching power supply 100' not to actively function, and now the power is supplied entirely from the switching power supply 100. As a result, the power required by the load 10 cannot be shared evenly between the switching power supply 100 and the switching power supply 100'.

In addition, multiple power supplies in a data center will be stacked in a rack. Because hot air will rise above, the upper switching power supplies will operate at higher temperature than the lower ones. This may result in the shortness of machine life for the upper switching power supplies. In this case, the user may increase the usage rate for the lower switching power supplies and decrease the usage rate for the upper ones to achieve consistent heat loss and to prolong the life cycle of the switching power supplies.

To achieve this goal, the current solution is to use signal lines and current share bus to connect each switching power supply to adjust its usage rate. However, this will cause the circuitry to be very complex, and the signals lines will be easily subject to environmental interference, which will in turn lead to system instability.

In addition, carbon reduction is becoming the current trend, and a growing number of data centers or manufacturing plants have begun to use renewable energy sources like solar panels or wind turbines to contribute to environmental conservation. However, due to the weather conditions, the power supplied from the renewable energy sources is often not stable or sufficient, so most of the data centers or manufacturing plants will not rely solely on renewable energy sources, but will combine them with the electricity provided by the public power plants. When combining these different power sources, they will need to work with different switching power supplies with different reference voltages—causing them unable to be combined in parallel. Thus, the power from the renewable energy sources are often instead stored in batteries, which will in turn be used to provide power to the data centers. Unfortunately, the process of storing these power to batteries and extracting the power from them is often inefficient.

SUMMARY OF THE INVENTION

In order to solve the above issues, the present invention provides switching power supplies whose usage rates can be adjusted without the need of signal lines and current share bus.

The present invention provides a switching power supply with an input terminal and an output terminal. The switching power supply comprises a power stage circuit, a current sensor, a current monitor, a gain module, a voltage divider circuit, a feedback circuit, and a switching power controller. Among them, the power stage circuit is coupled between the input terminal and the output terminal. The current sensor is coupled to sense the power stage circuit, and to provide a current sensing value. The current monitor is coupled to the current sensor to provide a sensing value corresponding to the current sensing value. The gain module is coupled to the current monitor to provide a gain value, and to provide a first feedback value from the sensing value through the gain value. The voltage divider circuit is coupled to the output terminal to provide a second feedback value by voltage-dividing an output voltage of the output terminal. The feedback circuit is coupled to the current monitor and the voltage divider circuit to provide a feedback signal based on a summed feedback value, wherein the summed feedback value is a sum of the first feedback value and the second feedback value. The switching power controller is coupled between the feedback circuit and the power stage circuit to control power conversion of the power stage circuit based on the feedback signal.

In the switching power supply described above, the current sensor is adapted to the back-end of the power stage circuit to sense the output current of the power stage circuit. The current monitor provides a corresponding sensing value based on the current sensing value, and amplify the sensing value to provide the first feedback value.

In the switching power supply described above, current sensor comprises a current sensing resistor coupled between the power stage circuit and the output terminal. The current monitor is coupled to both ends of the current sensing resistor to sense the current passing through the current sensing resistor and to send the provide a sensing value based on the sensing voltage.

In the switching power supply described above, the current sensor is coupled to a secondary side of a current transformer which is connected in series to an internal voltage converter of the power stage circuit to sense a secondary side current. The current monitor provides a corresponding sensing value to the second side current and amply the corresponding sensing value to provide the first feedback value.

In the switching power supply described above, the current sensor comprises a current transformer, a wave-rectifier circuit and a sampling circuit. The current transformer is coupled to a primary side of the power stage circuit to sense a primary side current passing through the primary side and to provide a corresponding sensing current to the secondary side. The wave-rectifier circuit is coupled to the current transformer to filter and rectify the sensing current to provide a corresponding first sensing voltage. The sampling circuit is coupled to the wave-rectifier circuit to sample the first sensing voltage to provide the second sensing voltage. The current monitor is coupled to the sampling circuit to provide the sensing value based on the second sensing voltage.

In the switching power supply described above, the voltage divider circuit comprises a first resistor, a second resistor, and a third resistor. The first resistor, the second resistor, and the third resistor are connected in series and between the output terminal and a ground terminal. A first common terminal of the first resistor and the second resistor outputs the sum of the first feedback value and the second feedback value to the feedback circuit. A second common terminal of the second resistor and the third resistor is coupled to the current monitor to receive the sensing value.

In the switching power supply described above, the gain module is coupled between the current monitor and the ground terminal, and provides the sensing value to the second common terminal of the second resistor and the third resistor.

In the switching power supply described above, the gain module is a variable resistor adapted to adjust the gain value by changing its resistance.

In the switching power supply described above, it may further include an adjustment interface coupled to the gain module to control the gain value of the gain module. The adjustment interface may further be coupled to the feedback circuit to control a reference voltage of the feedback circuit. The adjustment interface may be further coupled to the voltage divider circuit to adjust the summed feedback value.

The present invention also provides a power supply apparatus. The power supply apparatus may include at least two of the above-mentioned switching power supplies. The two switching power supplies are connected in parallel with their output terminals connected. In addition, the two switching power supplies may be connected to different types of input power sources.

In the switching power supplies described above, the two switching power supplies may have different rated output power values or different gain values.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
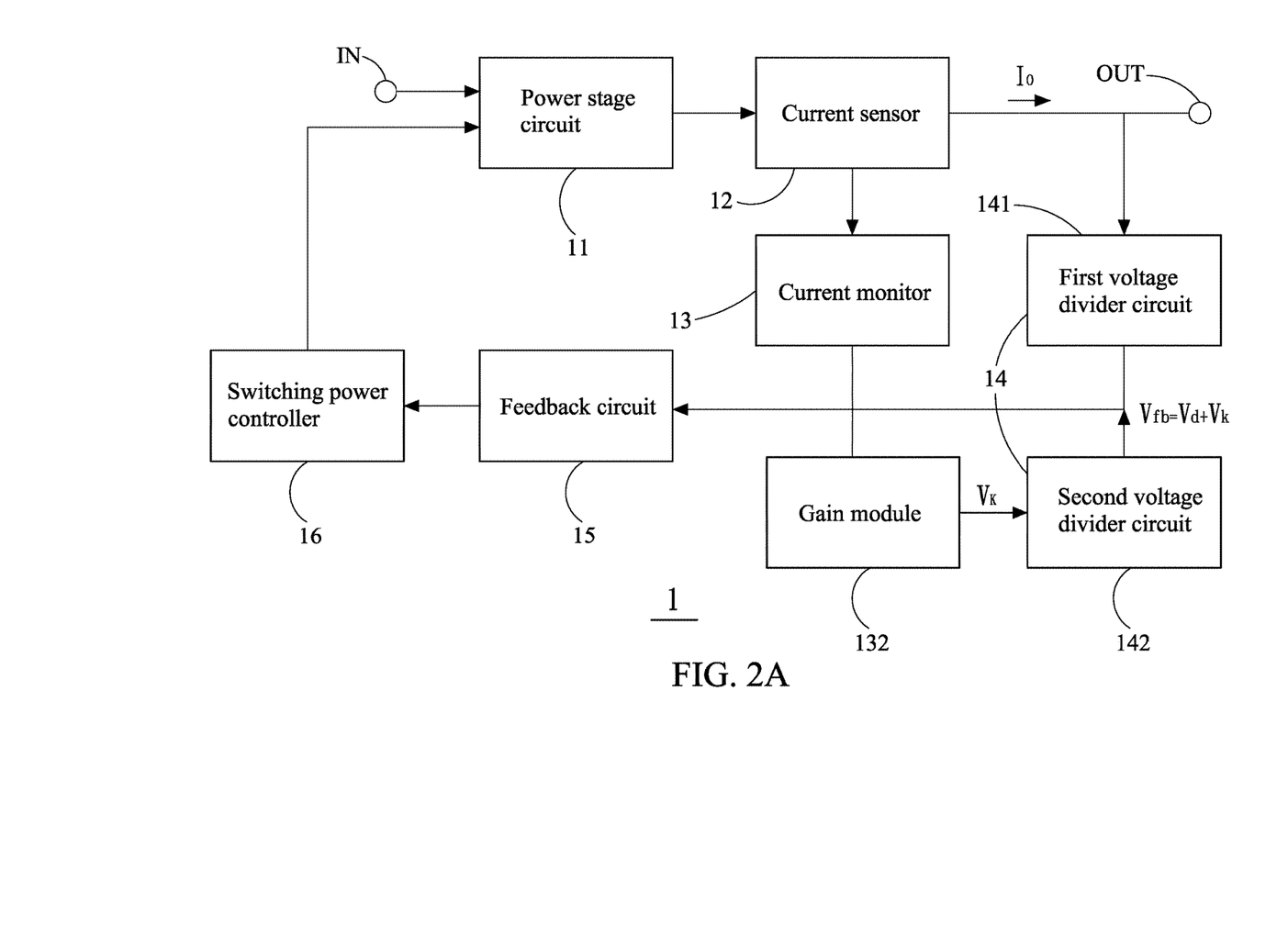
FIG. 2A provides a block diagram for a switching power supply according to an embodiment of the present invention.
Figure 2B:
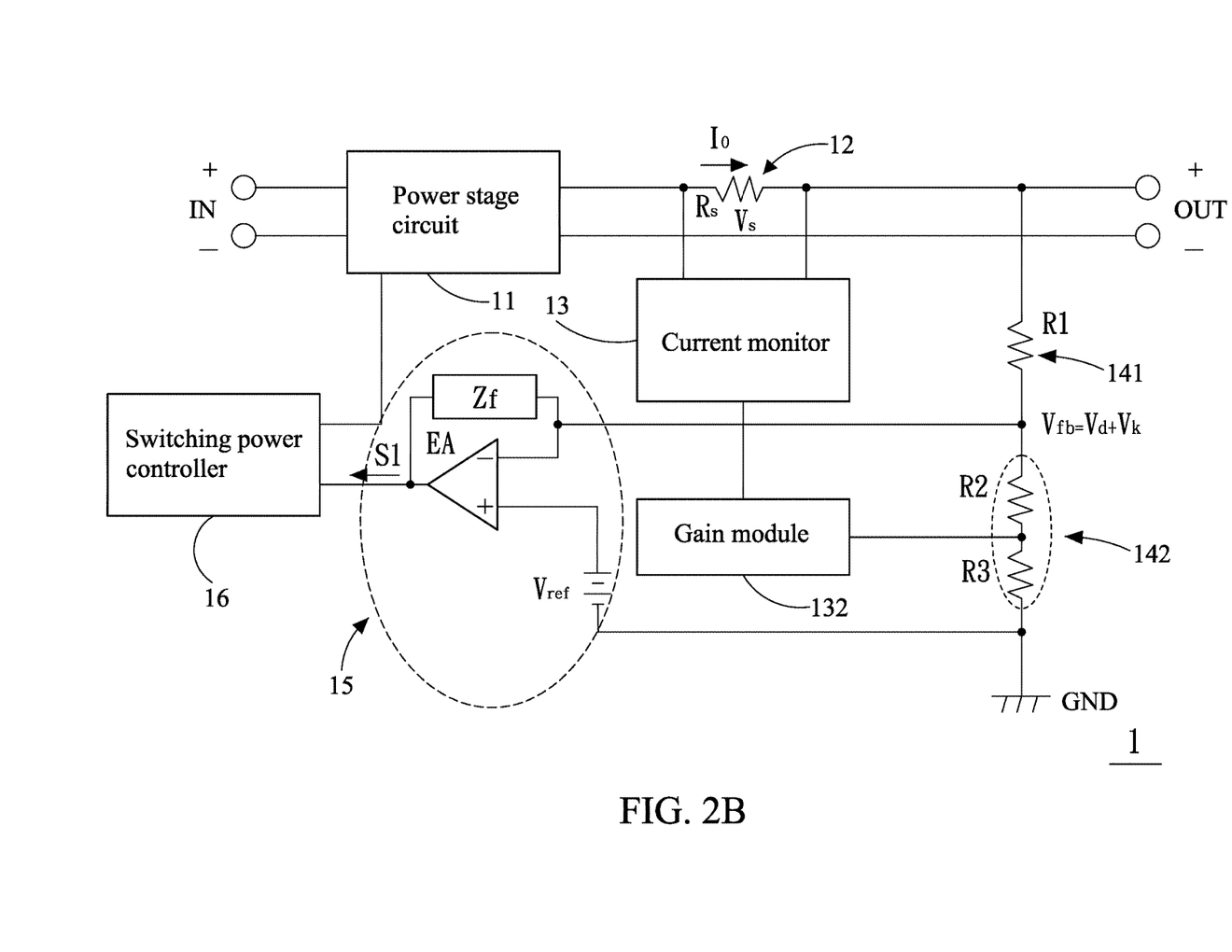
FIG. 2B provides a circuit diagram for a switching power supply according to an embodiment of the present invention.

Referring to FIGS. 2A and 2B, FIG. 2A provides a block diagram for a switching power supply according to an embodiment of the present invention, and FIG. 2B provides a circuit diagram for a switching power supply according to an embodiment of the present invention. According to some embodiments of the present invention, the switching power supply 1 has an input terminal IN and an output terminal OUT. The switching power supply 1 may include a power stage circuit 11, a current sensor 12, a current monitor 13, and a voltage divider circuit 14, a feedback circuit 15, and a switching power controller 16. Specifically, the power stage circuit 11 is coupled between the input terminal IN and the output terminal OUT, the current sensor 12 is coupled to the back of the power stage circuit 11 to sense the output current Io of the power stage circuit 11. In this embodiment, the current sensor 12 includes a current sensing resistor Rs that is coupled between the power stage circuit 11 and the output terminal OUT. The current monitor 13 is coupled to the current sensor 12 to provide a sensing value Vs according to the output current Io, and to amplify the sensing value Vs to provide a first feedback value Vk. The voltage divider circuit 14 is coupled to the output terminal OUT to voltage-divide the output voltage Vo at the output terminal OUT to provide a second feedback value Vd. In this embodiment, the voltage divider circuit 14 includes a first voltage divider circuit 141 and a second voltage divider circuit 142. The first voltage divider circuit 141 includes a first resistor R1. The second voltage divider circuit 142 includes a second resistor R2 and a third resistor R3. The first resistor R1, the second resistor R2, and the third resistor R3 are connected in series and coupled between the output terminal OUT and the ground GND. The sum of the first feedback value Vk and the second feedback value Vd is Vfb (hereinafter referred as "summed feedback value Vfb") is provided by the common terminal of the first resistor R1 and the second resistor R2.

The common terminal of the second resistor R2 and the third resistor R3 is coupled to the current monitor 13 to receive the sensing value Vk.

In this embodiment, the output terminal of the power stage circuit 11 may further include a filter circuit (not shown), which may include a capacitor to stabilize and filter the voltage. In addition, the power stage circuit 11 may incorporate a non-isolated topology converter or an isolated topology converter. A non-isolated topology converter may include a boost converter, a buck converter, or a SPEIC converter. An isolated topology converter may include a flyback converter, a forward converter, a half-bridge converter, and a resonant converter.

In addition, the gain module 132 in this embodiment is coupled between the current monitor 13 and the ground GND to provide a gain value K. The sensing value Vk can be provided from the gain value K and be output to the common terminal for the second resistor R2 and the third resistor R3. The gain module 132 may, for example, be a variable resistor that is capable of adjusting the gain value K through adjusting its resistance.

The feedback circuit 15 is coupled to the current monitor 13 and the voltage divider circuit 14 to provide a feedback signal S1 based on the sum of the first feedback value Vk and the second feedback value Vd. In this embodiment, the sum of the first feedback value Vk and the second feedback value Vd is Vfb, and Vfb is compared with the reference voltage Vref in the feedback circuit 15. When the summed feedback value Vfb is higher than the reference voltage Vref, the feedback circuit 15 will provide a feedback signal S1, which will be transmitted to the switching power controller 16. The switching power controller 16 is coupled to the feedback circuit 15 and the power stage circuit 11 to control the power conversion of the power stage 11 based on the feedback signal S1. When the switching power controller 16 receives the feedback signal S1, it will reduce the output current of the power stage circuit 11. In this embodiment, the switching power controller 16 is selected based on the topology of the power stage circuit 11, such as the pulse width modulation circuit or pulse frequency modulation circuit.

Figure 3:
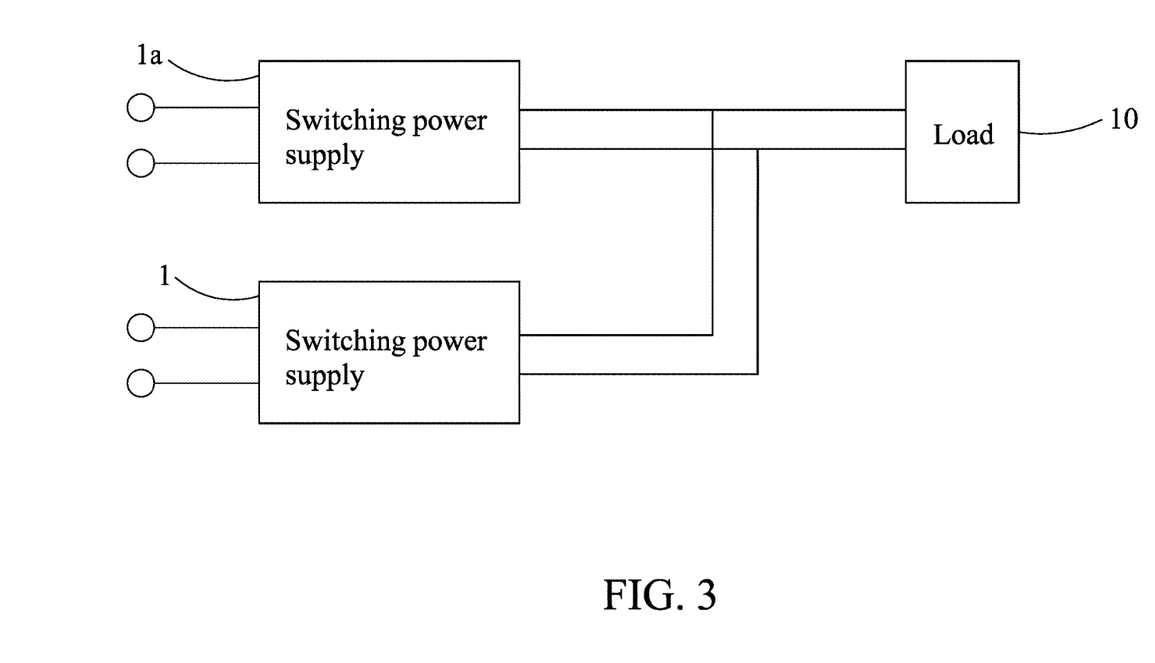
FIG. 3 provides an illustrative view of the power supply apparatus according to an embodiment of the present invention.

Referring to FIG. 3, FIG. 3 provides an illustrative view of the power supply apparatus according to an embodiment of the present invention. The power supply apparatus includes a switching power supply 1a and a switching power supply 1. The switching power supply 1a and the switching power supply 1 has the same circuitry structure with the same rated output power and gain value. The input terminals of the switching power supply 1a and the switching power supply 1 are coupled to the same type of input electrical source (e.g. public electricity), and the output terminals are coupled to the same load 10. Because the switching power supply 1 has a higher reference voltage, the actual output current Io of the switching power supply 1 will be much higher than the output current Io of the switching power supply 1a. Under this condition, the current sensor 12 of the switching power supply 1 will sense the output current Io of the power stage circuit 11, and the current monitor 13 and voltage divider 14 will provide, respectively, a first feedback value Vk and the second feedback value Vd. Because the switching power supply 1 has higher output current Io, it will provide a larger first feedback value Vk. This will result in the summed feedback value Vfb of the first switching power supply 1 to surpass the reference voltage Vref sooner. When the summed feedback value Vfb surpasses the reference voltage Vref, the feedback circuit 15 will produce feedback signal S1 and transmit the signal to the switching power controller 16 to reduce the output current Io of the switching power circuit 11. As the output current Io is reduced, the first feedback value Vk will also be reduced, and so is the summed feedback value Vfb. When the summed feedback value Vfb is below the reference voltage Vref, the feedback circuit 15 will no longer transmit feedback signal S1 to the switching power controller 16. This will cause the switching power controller 16 to increase the output current Io of the power stage circuit 11.

When the output current Io of the power stage circuit 11 drops, because the load 10 needs a fixed energy supply, the output current Io of the power stage circuit 11 of the switching power supply 1a will rise, which will cause the current monitor 13 of the switching power supply 1a to provide a higher first feedback value Vk. This will cause the summed feedback value Vfb to rise as well. Then, when the summed feedback value Vfb of the switching power supply 1a surpasses the reference voltage Vref, the feedback circuit 15 will produce and transmit a feedback signal S1 to the switching power controller 16 to cause the output current Io of the power stage circuit 11 to drop.

As explained, when the output current Io of the switching power supply 1 is higher, the output current Io of the switching power supply 1a will be lowered. Conversely, when the output current Io of the switching power supply 1 drops, the output current Io of the switching power supply 1a will rise. The cycle may continue again and again. Thus, when the two switching power supplies 1 and 1a are connected in parallel according to this embodiment, even though the two may have different reference voltages, based on the mechanism illustrated in the FIG. 2A, FIG. 2B, and FIG. 3, one can use the control mechanism from the current sensor 12, the current monitor 13, and the voltage divider circuit 14 to cause the switching power supply 1 and switching power supply 1a to share the energy required from the load 10. In another words, the power required by the load 10 may be jointly supplied by the switching power supply 1 and switching power supply 1a without the need for conventional signal lines and current share bus. Although FIG. 3 only illustrates two switching power supplies connected in parallel, the scope of the present invention may be applicable to the multiple switching power supplies (such as 3 or 4) connected in parallel to achieve the similar effect.

Figure 4A:
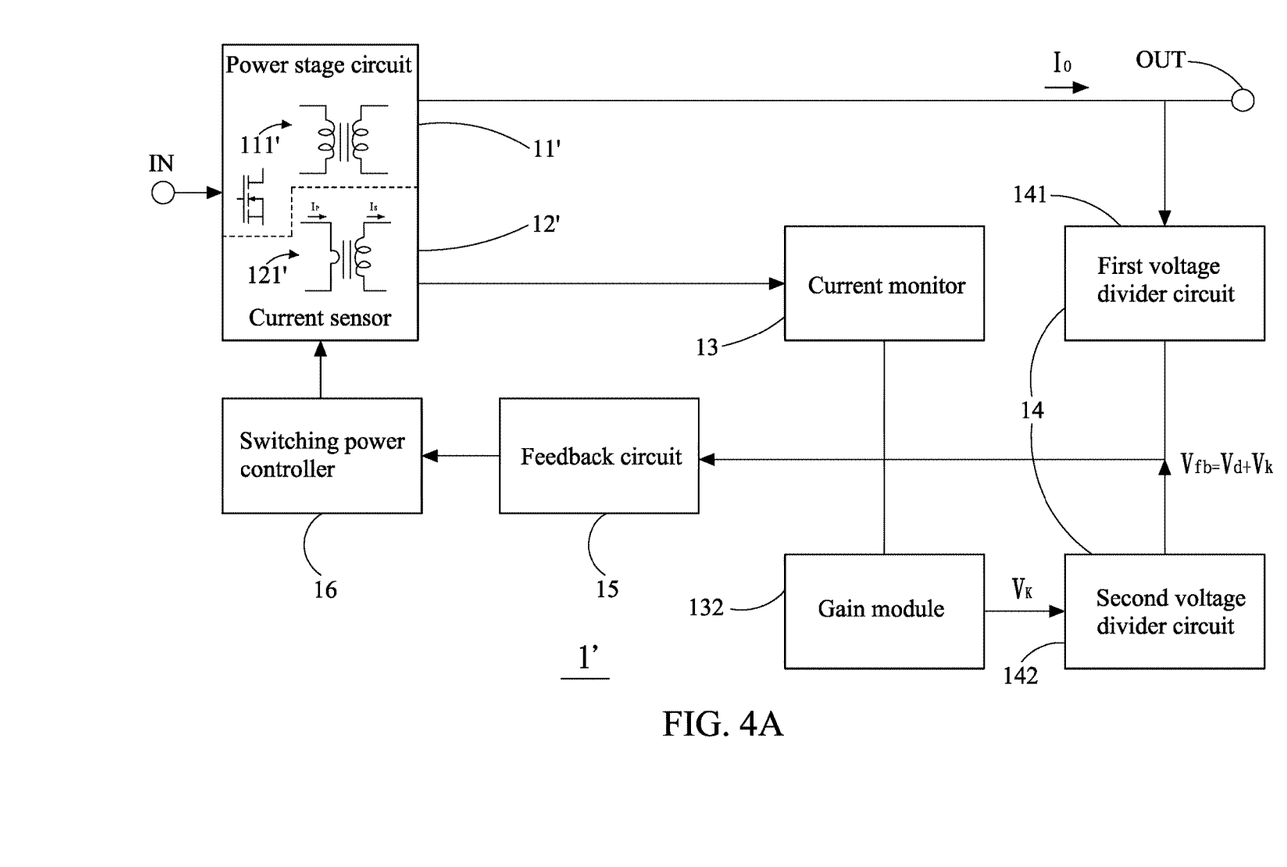
FIG. 4A provides a block diagram for another switching power supply according to an embodiment of the present invention.
Figure 4B:
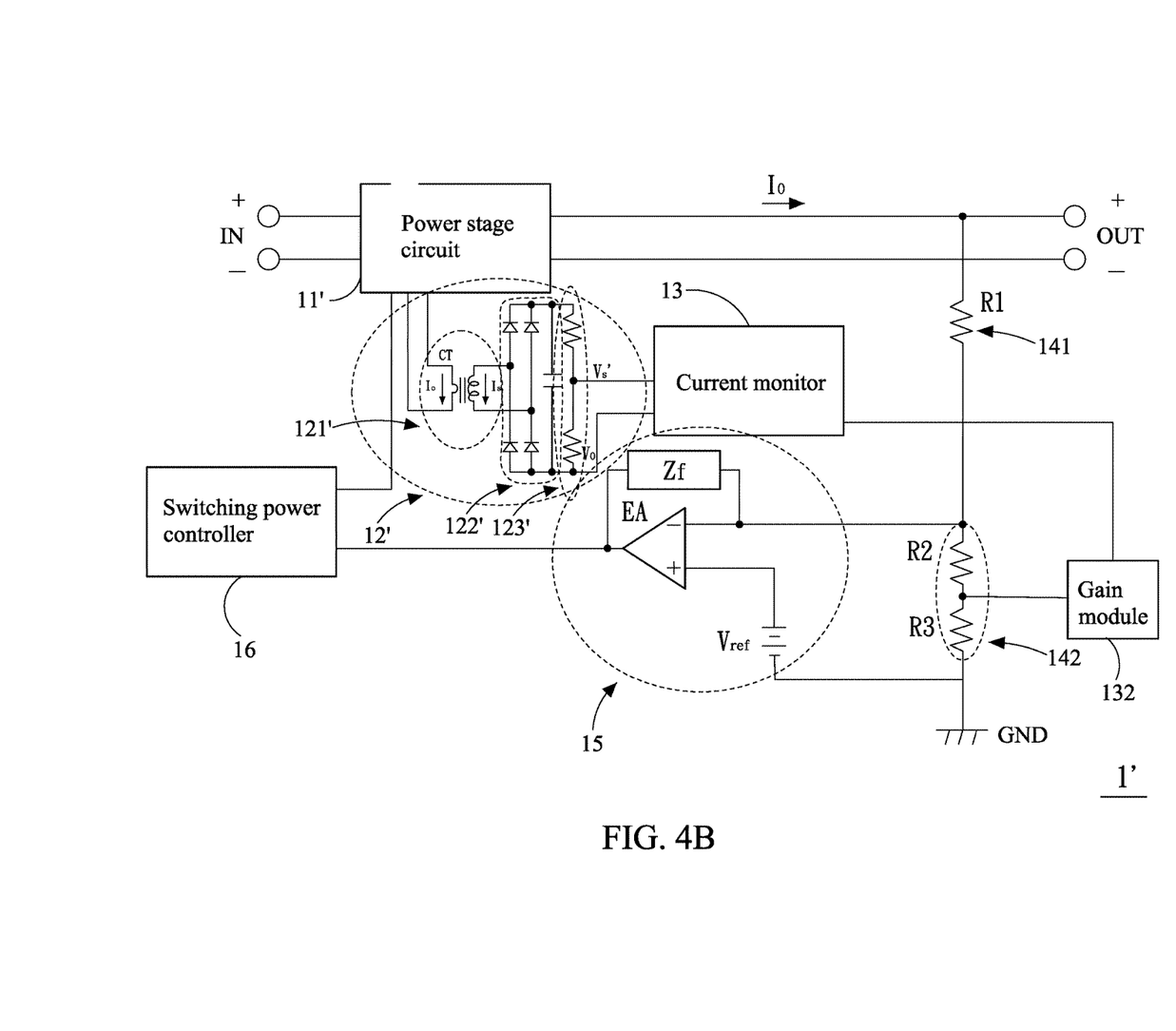
FIG. 4B provides a circuit diagram for another switching power supply according to an embodiment of the present invention.

Referring to FIG. 4A and FIG. 4B, FIG. 4A provides a block diagram for another switching power supply according to an embodiment of the present invention, and FIG. 4B provides a circuit diagram for another switching power supply according to an embodiment of the present invention. In the present embodiment, the same references relate to the same elements as in the previous embodiment. The switching power supply 1' has an input terminal IN and an output terminal OUT. The switching power supply 1' includes a power stage circuit 11', a current sensor 12', a current monitor 13, a voltage divider circuit 14, a feedback circuit 15, and a switching power controller 16. Specifically, the power stage circuit 11' is coupled between the input terminal IN and the output terminal OUT. The power stage circuit 11' has an internal converter 111' that is connected in series to a current transformer 121'. The internal converter 111' is coupled to the secondary side of the current transformer 121' to measure the secondary side current Is. Specifically, the current transformer 121' is coupled to the primary side of the power stage circuit 11' to measure the primary side current Ip passing the primary side so as to produce the corresponding sensing current Is at the secondary side of the current transformer 121'. In addition, the wave-rectifier circuit 122' is coupled to the current transformer 121' to filter and rectify the sensing current to provide a first sensing voltage. The sampling circuit 123' is coupled to the wave-rectifier circuit 122' to sample the first sensing voltage to provide a corresponding sensing value Vs'.

In FIG. 4, although the power stage circuit 11' and the current sensor 12' are separated by a dash line, the power stage circuit 11' and the current sensor 12' are integrated together. The current monitor 13 is coupled to the current sensor 12' to provide the corresponding sensing value Vs' based on the secondary side current Is, and to amplify the sensing value Vs' to provide a first feedback value Vk'. The voltage divider circuit 14 is coupled to the output terminal OUT to voltage-divide the output voltage Vo at the output terminal OUT to provide a second feedback value Vd. In this embodiment, the voltage divider includes a first voltage divider circuit 141 and a second voltage divider circuit 142, whereas the first voltage divider circuit 141 includes a first resister R1, and the second voltage divider circuit includes a second resister R2 and a third resister R3. The first resister R1, the second resister R2, and the third resister R3 are connected in series between the output terminal OUT and the ground terminal GND.

The feedback circuit 15 is coupled to the current monitor 13 and the voltage divider circuit 14. It is used to provide a feedback signal S1 based on the summed feedback value Vfb of the first feedback value Vk' and the second feedback value Vd. In this embodiment, the summed feedback value Ffb is compared to the reference voltage Vref of the feedback circuit 15. When the summed feedback value Vfb surpasses the reference voltage Vref, the feedback circuit 15 will provide and transmit a feedback signal S1 to the switching power controller 16. The switching power controller 16 is coupled between the feedback circuit 15 and the power stage circuit 11 to control the power conversion of the power stage circuit 11 based on the feedback signal S1. When the switching power controller 16 receives the feedback signal S1, it will reduce the output current Io of the power stage circuit 11.

In addition, because the current sensor 12 used in FIG. 2A and FIG. 2b incorporates a current sensing resistor Rs in series with the power stage circuit 11, when the current passing through the current sensing resister Rs is large, it will lead to large energy loss. To alleviate this problem, one may use the structure of the switching power supplies in FIG. 4A and FIG. 4B. Specifically, in case where one needs a high rated output power, or large output current, the switching power supply 1a and the switching power supply 1 in FIG. 3 may adopt the switching power supply 1' and the switching power supply 1' in the FIG. 4A and FIG. 4B to achieve the similar effect, i.e., the power demand by the load 10 can be share among each switching power supply.

In FIG. 3, the load 10 is shared by the switching power supply 1a and the switching power supply 1. However, due to deviation in their components, the feedback conditions will also differ. As a result, the output current for the switching power supplies may not be balanced. In order to have a balanced sharing of the current required by the load 10, again module may be used to adjust and cause each switching power supplies to have the same feedback condition.

In certain circumstance, even though the switching power supplies have the same rated output power, the user may nevertheless want each of the switching power supply to have different output power. For example, in a data center with hot air rising and cold air falling, even with the same usage rate for all switching power supplies, the upper switching power supplies will be operating at a higher temperature than the lower ones. Thus, the user may want to increase the usage rate of the lower switching power supplies and reduce the usage rate of the upper switching power supplies, so that the heat loss for each of them will tend to be the same. This can be achieved through adjusting the gain value K of each of the switching power supply, as will be described in more detail below.

Figure 5:
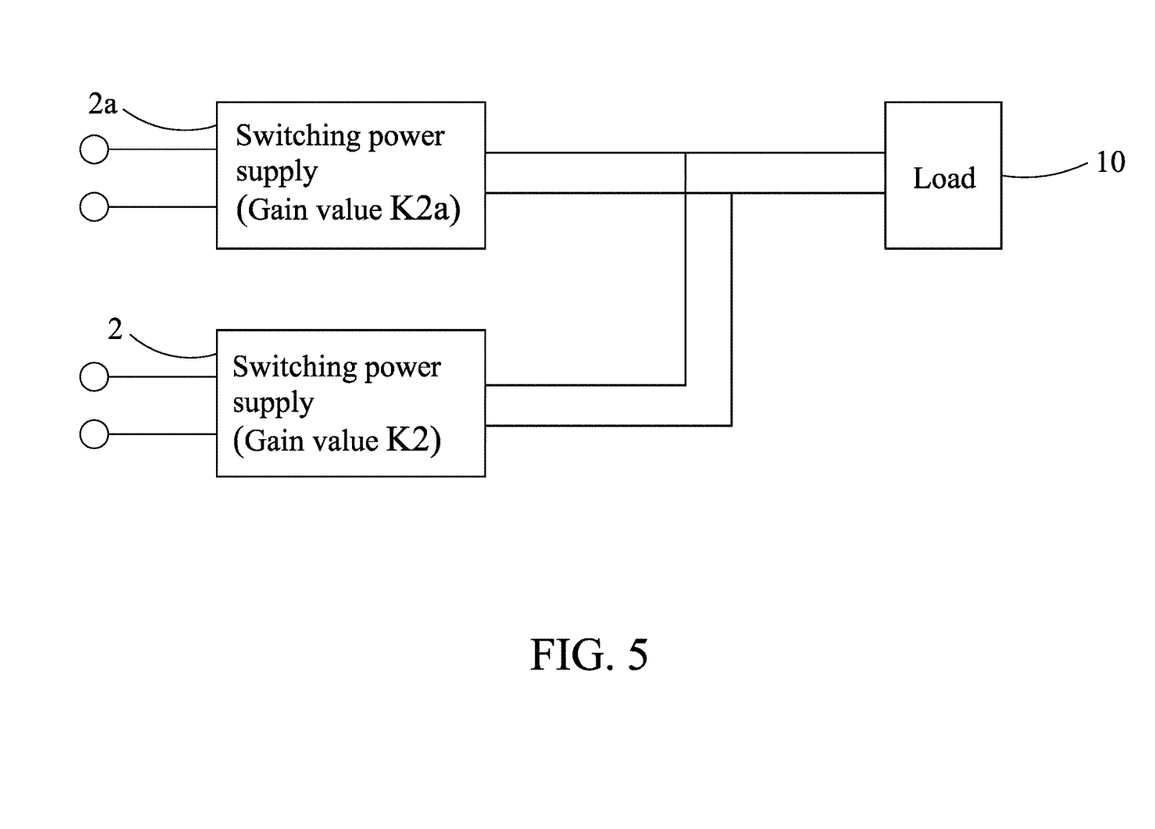
FIG. 5 provides an illustrative view of the another switching power supply apparatus according to an embodiment of the present invention.

Referring to FIG. 5, FIG. 5 provides an illustrative view of the another switching power supply apparatus according to an embodiment of the present invention. The power supply apparatus includes a switching power supply 2a and a switching power supply 2. The switching power supply 2a and the switching power supply 2 have the same rated output power but different gain values. In this embodiments, the gain value K2a of the switching power supply 2a is greater than the gain value K2 of the switching power supply 2. In a data center, therefore, the switching power supply 2a will be put above the switching power supply 2. In this embodiment, the switching power supply 2a and the switching power supply 2 may adopt the switching power supplies depicted in the FIG. 4A and FIG. 4B. This will be explained immediately next, along with depictions of FIG. 4A, FIG. 4B, and FIG. 5.

When the switching power supply 2a and the switching power supply 2 are activated, the individual current monitor 13 in each of them will provide a first feedback value Vk'. Because the switching power supply 2a has a larger gain value K, the first feedback value Vk' of the switching power supply 2a will be larger. As a result, the summed feedback value Vfb of the switching power supply 2a will be higher than the summed feedback value Vfb of the switching power supply 2. This will cause the feedback circuit 15 of the switching power supply 2a to generate the feedback signal S1 sooner to reduce the output current Io of the power stage circuit 11. When the output current Io is reduced, the summed feedback value Vfb will also drop. When the summed feedback value Vfb drops below the reference voltage Vref, the feedback circuit 15 will stop transmitting feedback signal S1 to the switching power controller 16, thereby causing the output current Io of the power stage circuit 11 to rise again. This above-described cycle may continue on and on.

On the contrary, in regard to the switching power supply 2, because the load 10 needs a fixed energy supply, when the output current Io of the switching power supply 2a drops, the output current Io of the switching power supply 2 will rise. This will cause the switching power supply 2 to have a higher first feedback value Vk' and a higher summed feedback value Vfb. When the summed feedback value Vfb of the switching power supply 2 surpasses the reference voltage Vref, the feedback circuit 15 will generate and transmit the feedback signal S1 to the switching power controller 16. This will reduce the output current Io of the switching power supply 2. This above-described cycle may continue on and on.

As previously explained, even though the switching power supply 2a and the switching power supply 2 have the same rated output power, because the switching power supply 2a has a higher gain value K, in their overall operation, the actual output power of the switching power supply 2a will be lower than the actual output power of the switching power supply 2. This will allow us to achieve our goal of unifying heat loss for the switching power supplies 2 and 2a.

Figure 6:
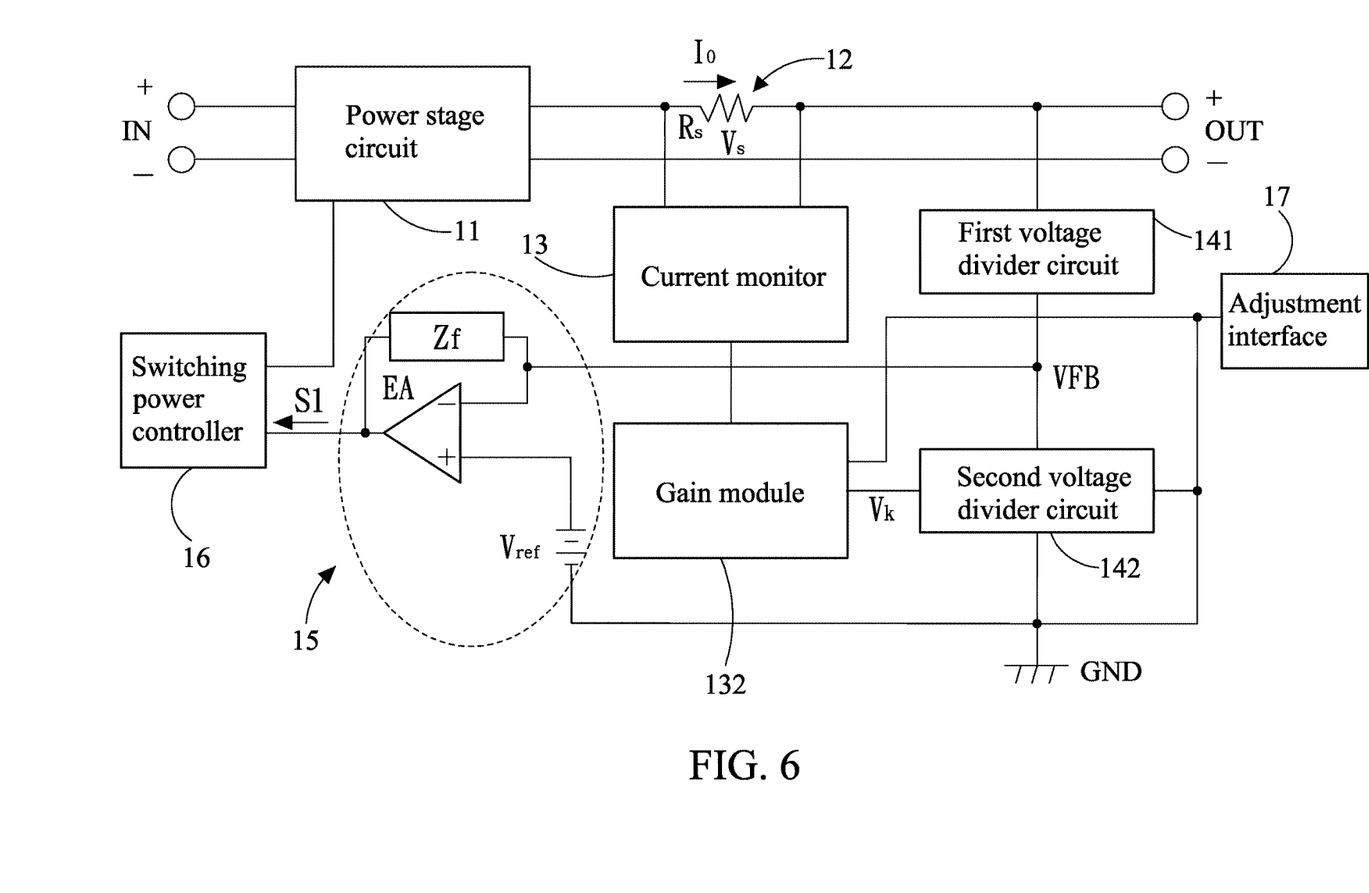
FIG. 6 provides a circuit diagram for yet another switching power supply according to an embodiment of the present invention.

Referring to FIG. 6, FIG. 6 provides a circuit diagram for yet another switching power supply according to an embodiment of the present invention. Compared to the switching power supply 1 in FIG. 2B, the switching power supply 3 in the present embodiment further include an adjustment interface 17. The adjustment interface 17 is coupled to the gain module 132, the feedback circuit 15, and the second voltage divider circuit 142 to adjust the gain value K of the gain module 132, the reference voltage Vref of the feedback circuit 15, and/or the resistance of the third resistor in the second voltage divider circuit 142. Specifically, the adjustment interface 17 may, for example, adjust the resistance of the third resistor R3 to change the second feedback value Vd. By adjusting the gain value K, one can adjust the summed feedback value Vfb. When the summed feedback value Vfb is higher, or when the reference voltage Vref is lower, the feedback circuit 15 may sooner generate and transmit the feedback signal S1 to the switching power controller 16 such that the output current Io of the power stage circuit 11 will be reduced. In addition, the switching power supply 1' in FIG. 4A may also incorporate the adjustment interface 17. Furthermore, the adjustment interface 17 may be coupled only to the gain module 132, the feedback circuit 15, or the second voltage divider circuit 142, and needs not be coupled to all of them. In another words, one can adjust the output power ratio of a switching power supply in a parallel connected setting by adjusting any of the following parameters: the gain value K of the gain module 132, the reference voltage Vref of the feedback circuit 15, and the resistance value of the third resistor R3 of the second voltage divider circuit 142.

Figure 7:
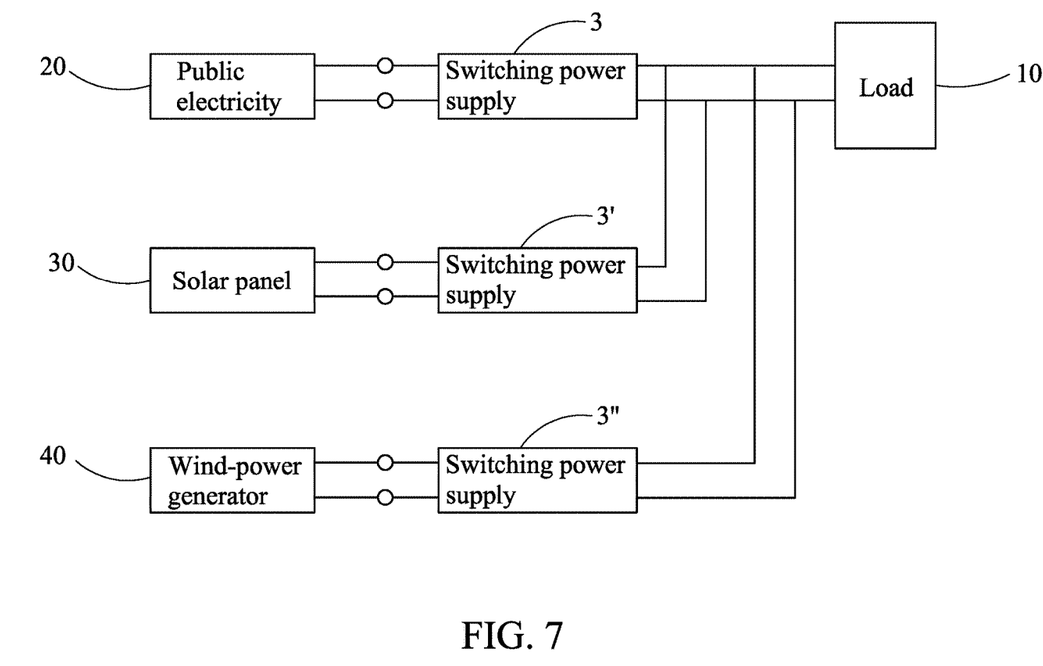
FIG. 7 provides an illustrative view of yet another switching power supply apparatus according to an embodiment of the present invention.

Referring to FIG. 7, FIG. 7 provides an illustrative view of yet another switching power supply apparatus according to an embodiment of the present invention. The power supply apparatus includes a switching power supply 3, a switching power supply 3' and a switching power supply 3". In addition, the switching power supply 3 is coupled to the public electricity 20, the switching power supply 3' is coupled to the solar panel 30, and the switching power supply 3" is coupled to the wind-power generator 40. In addition, the switching power supplies 3, 3' and 3" have different rated output power, but the switching power supplies 3, 3', and 3" have the same or similar circuit structure as depicted in the switching power supply 1' in FIG. 4A, wherein they all include a control mechanism provided by the current sensor 12', a current monitor 13, and a voltage divider circuit 14. This will allow the switching power supplies 3, 3', and 3" to be used in parallel. Compared with the conventional method, the power supply apparatus does not need the use of the battery and therefore has higher output efficiency.

In summary, the advantages of the switching power supply include the following:
1. Two or more switching power supplies can be used in parallel when they have the same kind of input power and the same rated output power.
2. Two or more switching power supplies can be used in parallel when they have the same rated output power but different kinds of input power.
3. Two or more switching power supplies can be used in parallel when they have the same kind of input power but different rated output powers.
4. Two or more switching power supplies can be used in parallel when they have different kinds of input power and different rated output power.
5. When the above-described switching power supplies are connected in parallel, the respective load proportion of each of them can be adjusted at will.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A switching power supply with an input terminal and an output terminal, comprising:
   a power stage circuit coupled between the input terminal and the output terminal;
   a current sensor coupled to sense the power stage circuit, and to provide a current sensing value;
   a current monitor coupled to the current sensor to provide a sensing value corresponding to the current sensing value;
   a gain module coupled to the current monitor to provide a gain value, and to provide a first feedback value from the sensing value through the gain value;
   a voltage divider circuit coupled to the output terminal to provide a second feedback value by voltage-dividing an output voltage of the output terminal;
   a feedback circuit coupled to the current monitor and the voltage divider circuit to provide a feedback signal based on a summed feedback value, wherein the summed feedback value is a sum of the first feedback value and the second feedback value; and
   a switching power controller coupled between the feedback circuit and the power stage circuit to control power conversion of the power stage circuit based on the feedback signal.

2. The switching power supply of claim 1, wherein the current sensor comprises a current sensing resister coupled between the power stage circuit and the output terminal, and wherein the current monitor is coupled to both ends of the current sensing resistor to measure a sensed voltage produced by a current passing through the current sensing resistor, and to provide the sensing value based on the sensed voltage.

3. The switching power supply of claim 1, wherein the current sensor is coupled to a secondary side of a current transformer which is connected in series to an internal voltage converter of the power stage circuit to sense a secondary side current, and wherein the current monitor provides a corresponding sensing value to the second side current and amply the corresponding sensing value to provide the first feedback value.

4. The switching power supply of claim 3, wherein the current sensor comprises:
   a current transformer coupled to a primary side of the power stage circuit to sense a primary side current passing through the primary side and to provide a corresponding sensing current to the secondary side;
   a wave-rectifier circuit coupled to the current transformer to filter and rectify the sensing current to provide a corresponding sensing voltage; and
   a sampling circuit coupled to the wave-rectifier circuit to sample the sensing voltage to provide the corresponding sensing value;
   wherein the current monitor is coupled to the sampling circuit to provide the first feedback value based on the sensing value.

5. The switching power supply of claim 1, wherein the voltage divider circuit comprises a first resistor, a second resistor, and a third resistor, wherein the first resistor, the second resistor, and the third resistor are connected in series and between the output terminal and a ground terminal, wherein a first common terminal of the first resistor and the second resistor outputs the sum of the first feedback value and the second feedback value to the feedback circuit, and wherein a second common terminal of the second resistor and the third resistor is coupled to the current monitor to receive the sensing value.

6. The switching power supply of claim 5, wherein the gain module is coupled between the current monitor and the ground terminal, and provides the sensing value to the second common terminal of the second resistor and the third resistor.

7. The switching power supply of claim 1, wherein the gain module is a variable resistor adapted to adjust the gain value by changing its resistance.

8. The switching power supply of claim 1, further comprising an adjustment interface coupled to the gain module to control the gain value of the gain module.

9. The switching power supply of claim 8, wherein the adjustment interface is coupled to the feedback circuit to control a reference voltage of the feedback circuit.

10. The switching power supply of claim 8, wherein the adjustment interface is coupled to the voltage divider circuit to adjust the summed feedback value.

11. A power supply apparatus, comprising two switching power supplies as described in claim 1 that are connected in parallel with their output terminals connected.

12. The power supply apparatus of claim 11, wherein the two switching power supplies are connected to different types of input power sources.

13. The power supply apparatus of claim 11, wherein the two switching power supplies are connected to a same type of input power source.

14. The power supply apparatus of claim 11, wherein the two switching power supplies have different rated output power values.

15. The power supply apparatus of claim 11, wherein the two switching power supplies have the same rated output power value.

16. The power supply apparatus of claim 11, wherein the two switching power supplies have different gain values.

17. The power supply apparatus of claim 11, wherein the two switching power supplies have the same gain values.

* * * * *